US012803296B2

(12) United States Patent
Deutsch

(10) Patent No.: US 12,803,296 B2
(45) Date of Patent: Nov. 17, 2026

(54) ULTRACAPACITOR MODULE WITH ADAPTIVE BUS VOLTAGE CONTROL SYSTEM

(71) Applicant: Aptiv Technologies AG, Schaffhausen (CH)

(72) Inventor: Robert Deutsch, Shelby Township, MI (US)

(73) Assignee: Aptiv Technologies AG, Schaffhausen (CH)

( * ) Notice: Subject to any disclaimer, the term of this patent is extended or adjusted under 35 U.S.C. 154(b) by 538 days.

(21) Appl. No.: 18/515,352

(22) Filed: Nov. 21, 2023

(65) Prior Publication Data

US 2024/0171076 A1 May 23, 2024

Related U.S. Application Data

(60) Provisional application No. 63/462,339, filed on Apr. 27, 2023, provisional application No. 63/427,189, filed on Nov. 22, 2022.

(51) Int. Cl.
*H02J 7/34* (2006.01)

(52) U.S. Cl.
CPC .................................... *H02J 7/345* (2013.01)

(58) Field of Classification Search
CPC ....... H02M 1/126; H02M 3/1582; H02J 7/345
(Continued)

(56) References Cited

U.S. PATENT DOCUMENTS

| | | | |
|---|---|---|---|
| 7,599,167 | B2 | 10/2009 | Doljack |
| 8,198,870 | B2 | 6/2012 | Zuercher |

(Continued)

FOREIGN PATENT DOCUMENTS

| | | | |
|---|---|---|---|
| CN | 101170263 A | | 4/2008 |
| CN | 202503323 U | | 10/2012 |
| WO | 2011090511 A2 | | 7/2011 |
| WO | 2013138380 A2 | | 9/2013 |
| WO | 2022060892 A1 | | 3/2022 |

OTHER PUBLICATIONS

"Extended European Search Report for EP Application No. 24215714.7"; European Patent Office; mailed on May 7, 2025; 9 Pages.

(Continued)

*Primary Examiner* — Michael R. Fin
(74) *Attorney, Agent, or Firm* — Harness, Dickey & Pierce, P.L.C.

(57) ABSTRACT

An ultracapacitor module may include an ultracapacitor cell stack, a boost/buck DC/DC converter, a temperature sensor configured to measure a temperature T, a voltage sensor configured to determine an operating voltage Vo of the voltage supply bus; and an electronic controller connected with the DC/DC converter, the temperature sensor, and the voltage sensor. The ultracapacitor cell stack and the DC/DC converter are connected with the voltage supply bus, The electronic controller is configured to determine an initial voltage value Vi corresponding to the measured temperature T, determine an adjustment voltage value Va when the rate of change dV/dt of the operating voltage Vo is less than a predetermined threshold, calculate a target bus voltage value Vt using a first formula Vt=Vi+Va, and control the DC/DC converter to be in a boost mode or a buck mode to maintain the voltage Vo near the voltage value Vt.

19 Claims, 6 Drawing Sheets

(58) Field of Classification Search
USPC .......................................................... 320/167
See application file for complete search history.

(56) References Cited

U.S. PATENT DOCUMENTS

| | | | | |
|---|---|---|---|---|
| 9,209,653 | B2 | 12/2015 | Maynard et al. | |
| 9,214,709 | B2 | 12/2015 | Cooley et al. | |
| 9,272,627 | B2 | 3/2016 | Miller | |
| 9,331,500 | B2 | 5/2016 | Knitt et al. | |
| 9,809,128 | B2 | 11/2017 | Berry et al. | |
| 10,272,788 | B2 | 4/2019 | Huh et al. | |
| 10,374,440 | B2 | 8/2019 | Altemose | |
| 10,596,909 | B2 | 3/2020 | Choi et al. | |
| 10,923,946 | B1 | 2/2021 | Cremona et al. | |
| 11,159,038 | B2 | 10/2021 | Kaminsky | |
| 11,220,988 | B2 * | 1/2022 | Ciaccio | F02N 11/04 |
| 11,288,200 | B2 | 3/2022 | Mallory | |
| 2007/0164693 | A1 | 7/2007 | King et al. | |
| 2008/0277175 | A1 * | 11/2008 | Tyler | B60L 58/33 320/101 |
| 2009/0309416 | A1 | 12/2009 | Bose et al. | |
| 2010/0133025 | A1 | 6/2010 | Flett | |
| 2012/0235473 | A1 | 9/2012 | Jiang et al. | |
| 2012/0237799 | A1 | 9/2012 | Jiang et al. | |
| 2015/0148973 | A1 | 5/2015 | Ye et al. | |
| 2015/0149799 | A1 | 5/2015 | Ye et al. | |
| 2015/0203850 | A1 | 7/2015 | Barrat et al. | |
| 2015/0283911 | A1 | 10/2015 | Ambrosio | |
| 2017/0203850 | A1 | 7/2017 | Wang et al. | |
| 2018/0166892 | A1 | 6/2018 | Sepe et al. | |
| 2018/0198290 | A1 | 7/2018 | Rohera | |
| 2021/0319152 | A1 | 10/2021 | Couture et al. | |
| 2022/0190629 | A1 | 6/2022 | Varigonda et al. | |

OTHER PUBLICATIONS

Laadjal, et al., "Supercapacitors Online Parameters Estimation and State-of-Health Determination in Hybrid", 2021 IEEE 13th International Symposium on Diagnostics for Electrical Machines, Power Electronics and Drives (SDEMPED), IEEE, vol. 1, Aug. 22, 2021 (Aug. 22, 2021), pp. 261-266, 6 Pages.

Quintans, et al., "Methodology to Obtain the Voltage-Dependent Parameters of a Fourth-Order Supercapacitor Model With the Transient Response to Current Pulses", IEEE Transactions on Power Electronics, Nstitute of Electrical and Electronics Engineers, USA, vol. 32, No. 5, May 1, 2017 (May 1, 2017), pp. 3868-3878, XP011640395, ISSN: 0885-8993, DOI: 10.1109/TPEL.

Rubartsch, et al., "On-Line Diagnosis of Supply Voltage Stabilizing Capacitors in Automotive Electronic Systems", 2023 IEEE Vehicle Power and Propulsion Conference (VPPC), IEEE, Oct. 24, 2023 (Oct. 24, 2023), pp. 1-6, XP034532389, DOI: 10.1109/VPPC60535.2023.10403181 [retrieved on Jan. 30, 2024], Oct. 24, 2023, 6 Pages.

"Extended European Search Report"; European Patent Office; mailed on Apr. 25, 2024; 9 pages.

"Backup Power Supply Modules with Electric Double Layer Capacitors", Panasonic Industry; https://industrial.panasonic.com/ww/products/pt/edlc-backup-power-supply-modules; Last viewed on Nov. 16, 2023.

"Using Supercapacitors with Motors—DC/DC converter?", Electrical Engineering; https://electronics.stackexchange.com/questions/334455/using-supercapacitors-with-motors-dc-dc-converter; Last viewed on Nov. 16, 2023.

Khasiev, Victor , "Bidirectional DC/DC Regulator and Supercapacitor Charger / Design Note DN558: Introduction", Analog Devices; https://www.analog.com/en/technical-articles/bidirectional-dc-dc-regulator-and-supercapacitor-charger.html; last viewed on Nov. 16, 2023.

Reigstad, Marius , "Bidirectional DC-DC Converter for Supercapacitor as DC-bus Stabilization Element", Master's thesis in Energy, The University of Bergen, May 31, 2021., 151 pages.

"Extended European Search Report for Application No. 23211479.3"; European Patent Office; Mailed on May 6, 2024; 5 Pages.

"Extended European Search Report for Application No. 23211477.7"; European Patent Office; Mailed on May 27, 2024; 8 Pages.

"Extended European Search Report for Application No. 23211451.2"; European Patent Office; Mailed on Jun. 6, 2024; 7 Pages.

* cited by examiner

100

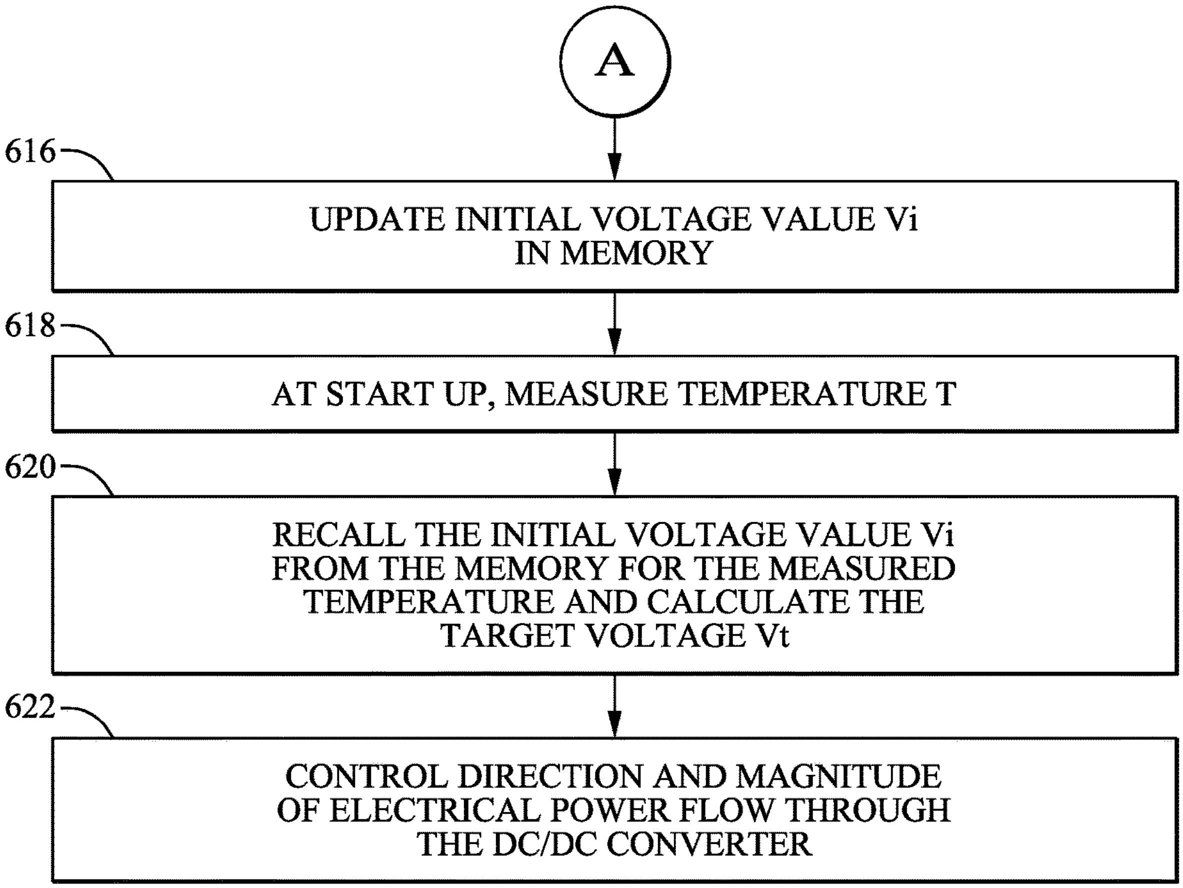
FIG. 6 CONT,D

ULTRACAPACITOR MODULE WITH ADAPTIVE BUS VOLTAGE CONTROL SYSTEM

CROSS-REFERENCE TO RELATED APPLICATIONS

This application claims the benefit of and priority to U.S. Provisional Application 63/427,189, titled "Ultracapacitor Module with Adaptive Bus Voltage Control System", filed Nov. 22, 2022, and further claims the benefit of and priority to U.S. Provisional Application 63/462,339, titled "Ultracapacitor Module with Adaptive Bus Voltage Control System", filed Apr. 27, 2023, the contents of each of which are incorporated by reference herein.

TECHNICAL FIELD

This disclosure is directed to an ultracapacitor module with an adaptive bus voltage control system.

BACKGROUND

Typically, an ultracapacitor module connected to a voltage supply bus has no ability to control the current sourced from or provided to the ultracapacitor. An example of this may be found in an ultracapacitor module in a voltage stabilization system that increases the voltage of the voltage supply bus of a vehicle while the starter system of an internal combustion engine is engaged and includes a parallel DC/DC converter to recharge the capacitors in the ultracapacitor module. Another example is a backup power supply module which increases the voltage of the voltage supply bus of a vehicle when the bus voltage sags. This module also includes a parallel DC/DC converter to recharge the capacitors in the ultracapacitor module. These examples have no need for adaptive voltage control because they have no method of controlling a response of the ultracapacitor module to voltage transients on the voltage supply bus. In these examples, the capacitor voltage and the working range of the voltage supply bus are the same. There is no control of the bus voltage other than the natural control provided by the capacitor(s).

SUMMARY

In some aspects, the techniques described herein relate to an ultracapacitor module configured to be connected to a voltage supply bus of a vehicle, the ultracapacitor module including: an ultracapacitor cell stack containing one or more ultracapacitor cells; a bidirectional boost/buck DC/DC converter, wherein the ultracapacitor cell stack and the DC/DC converter are connected in series with the voltage supply bus; a temperature sensor configured to measure a temperature T; one or more voltage sensors configured to determine an operating voltage Vo of the voltage supply bus; and an electronic controller in electrical communication with the DC/DC converter, the temperature sensor, and the one or more voltage sensors, wherein the electronic controller is configured to: determine an initial voltage value Vi corresponding to the measured temperature T, determine an adjustment voltage value Va when the rate of change dV/dt of the operating voltage Vo is less than a predetermined threshold, calculate a target bus voltage value Vt using a first formula Vt=Vi+Va, and control the DC/DC converter to be in a boost mode or a buck mode to maintain the operating voltage Vo at or near the target bus voltage value Vt.

In some aspects, the techniques described herein relate to a method of operating an ultracapacitor module connected to a voltage supply bus of a vehicle, the ultracapacitor module having an ultracapacitor cell stack containing one or more ultracapacitor cells in series/parallel combination, a bidirectional boost/buck DC/DC converter, wherein the ultracapacitor cell stack and the DC/DC converter are connected in series with the voltage supply bus, a temperature sensor configured to measure a temperature T, one or more voltage sensors configured to determine an operating voltage Vo of the voltage supply bus, and an electronic controller in electrical communication with the DC/DC converter, the temperature sensor, and the one or more voltage sensors, the method including: determining an initial voltage value Vi via the electronic controller corresponding to the measured temperature T; determining an adjustment voltage value Va via the electronic controller when the rate of change dV/dt of the operating voltage Vo is less than a predetermined threshold and vehicle is operating and mobile, calculating a target bus voltage value Vt via the electronic controller using a first formula Vt=Vi+Va, and controlling the DC/DC converter via the electronic controller to be in a boost mode or a buck mode to maintain the operating voltage Vo at or near the target bus voltage value Vt.

In some aspects, the techniques described herein relate to a computer readable medium containing program instructions for operating an ultracapacitor module connected to a voltage supply bus of a vehicle, the ultracapacitor module having an ultracapacitor cell stack containing one or more ultracapacitor cells, a bidirectional boost/buck DC/DC converter, wherein the ultracapacitor cell stack and the DC/DC converter are connected in series with the voltage supply bus, a temperature sensor configured to measure a temperature T, one or more voltage sensors configured to determine an operating voltage Vo of the voltage supply bus, and an electronic controller in electrical communication with the DC/DC converter, the temperature sensor, and the one or more voltage sensors, wherein execution of the program instructions by one or more processors of a computer system causes the electronic controller to carry out: determining an initial voltage value Vi corresponding to the measured temperature T; determining an adjustment voltage value Va when the rate of change dV/dt of the operating voltage Vo is less than a predetermined threshold and vehicle is operating, calculating a target bus voltage value Vt using a first formula Vt=Vi+Va, and controlling the DC/DC converter to be in a boost mode or a buck mode to maintain the operating voltage Vo at or near the target bus voltage value Vt.

BRIEF DESCRIPTION OF THE DRAWINGS

The ultracapacitor module will now be described, by way of example with reference to the accompanying drawings, in which.

DETAILED DESCRIPTION

Figure 1:
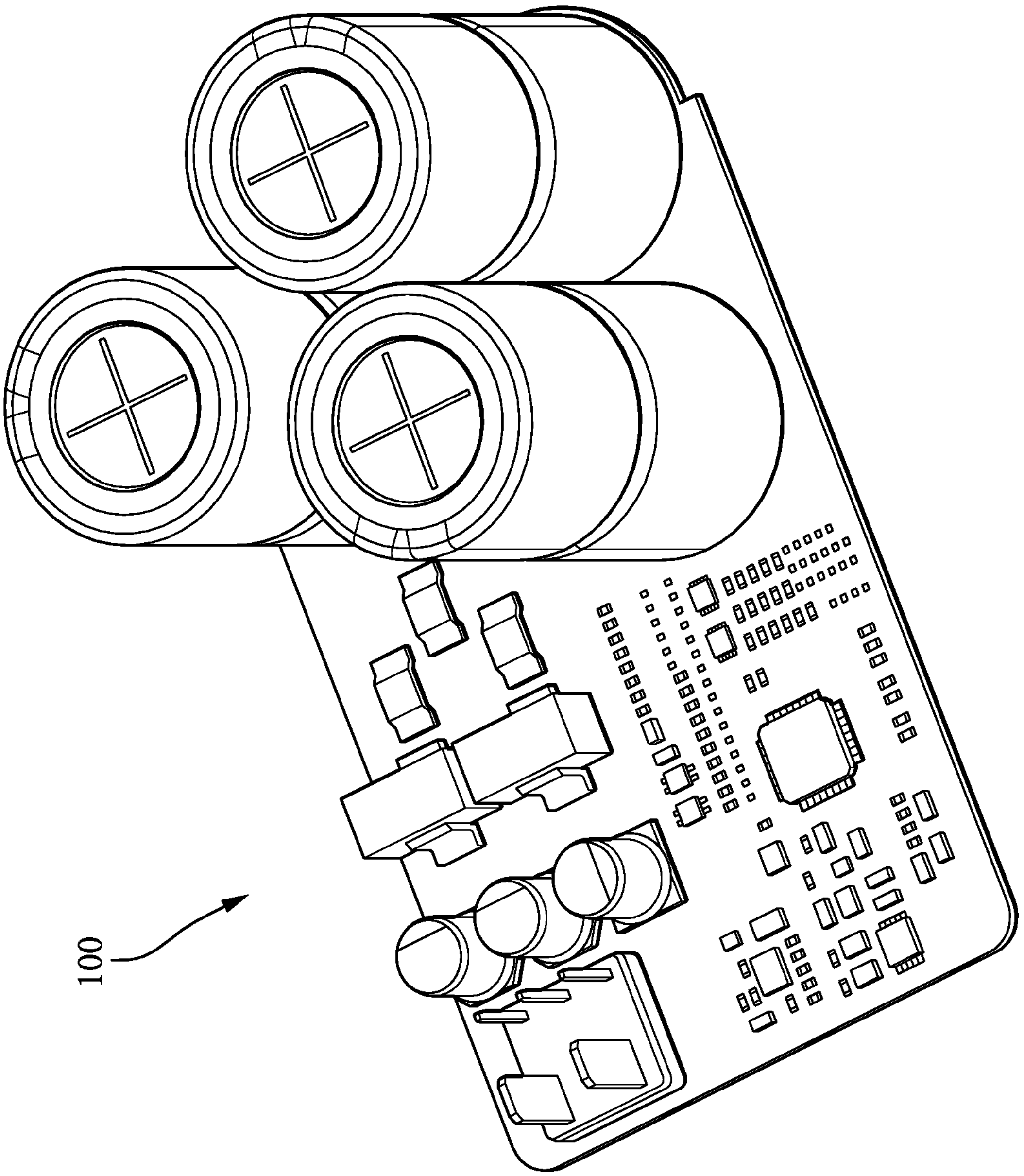
FIG. 1 is an isometric view of an ultracapacitor module according to some embodiments.

The present disclosure describes an ultracapacitor module shown in FIG. 1, hereafter referred to as the UCM 100. The UCM 100 addresses many of the deficiencies of the prior art described above. The UCM 100 in this example protects the voltage supply bus in a vehicle, e.g., an internal combustion engine vehicle, a hybrid electric vehicle, or an electric vehicle, from voltage sags or flyback voltage spikes caused by the switching of high current draw loads on and off on the voltage supply bus, e.g., electric antilock brakes, electric power steering, etc., thereby providing protection from voltage sags and flyback voltage spikes having a duration of 100 microseconds to 100 milliseconds to other electronic modules on the voltage supply bus. The UCM 100 may also or alternatively be configured to provide emergency back-up power to satisfy safety critical systems, such as brake-by-wire or power door locks, for a short duration of time, for example 1 to 2 seconds, in case of a loss of the primary electrical power supply in order to meet the necessary automotive safety integrity level (ASIL) of these systems, such as defined by the International Standards Organization (ISO) 26262-1:2001 Road Vehicle Functions Safety Standard.

Figure 2:
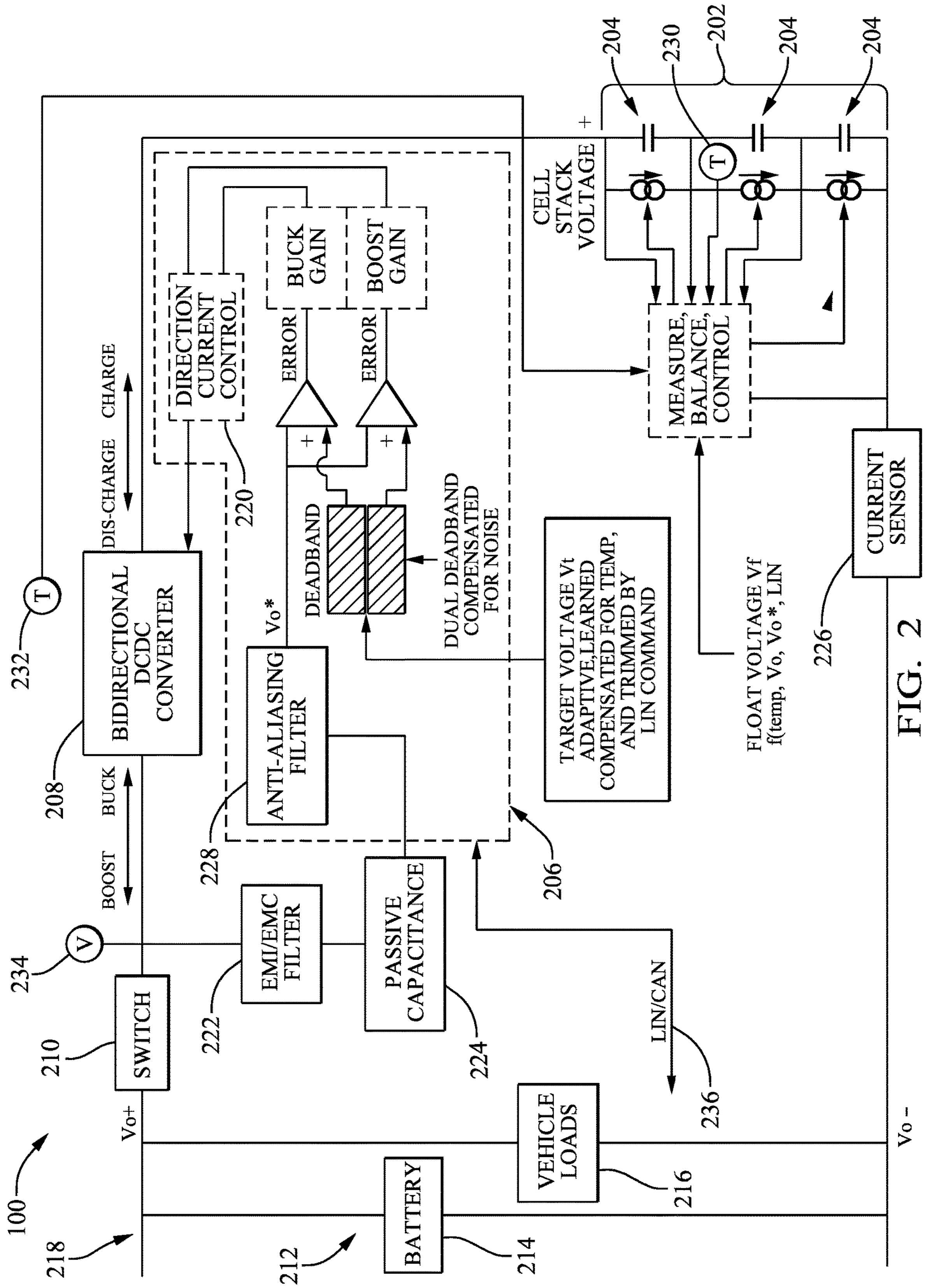
FIG. 2 is a schematic diagram of system components of an ultracapacitor module according to some embodiments.

As shown in FIG. 2, the UCM 100 includes an ultracapacitor cell stack 202 that has several ultracapacitor cells 204. As used herein, an ultracapacitor cell is a capacitive storage device having a capacitance of at least 100 farads. In this example three 325 farad, 2.7 volt ultracapacitor cells 204 are connected in series, thereby providing the ultracapacitor cell stack 202 with an equivalent capacitance of 108 farads and a working range of 5.0 to 8.4 volts. The configuration of the ultracapacitor cell stack 202 could be 3S1P (3 cells in series and 1 parallel string with 108 F and 8.4V max) as in this example, or it could be 3S2P (3 cells in series and 2 parallel strings with 217 F and 8.4V max), or in general xSyP. The ultracapacitor cell stack 202 is configured to operate at currents up to 200 amperes. The UCM 100 also includes an electronic controller 206 which controls the voltage of each ultracapacitor cell 204 and thereby controls the voltage of the ultracapacitor cell stack 202. The electronic controller 206 has one or more processors and one or more memory devices. The processors may be microprocessors, application specific integrated circuits (ASIC), or built from discrete logic and timing circuits (not shown). Software instructions that program the processors may be stored in a non-volatile memory device (not shown). The memory device may be contained within the microprocessor or ASIC. Alternatively, the memory device may be a separate device. Non-limiting examples of the types of memory device that may be used include electrically erasable programmable read only memory (EEPROM), masked read only memory (ROM), and flash memory devices.

The UCM 100 further includes a bidirectional boost/buck DC/DC converter 208 that is capable of conducting at least the same current as the ultracapacitor cell stack 202 as the current flows in to or out of the ultracapacitor cell stack 202. Under the control of the electronic controller 206, the DC/DC converter 208 quickly switches between boost and buck modes. The time period for this transition is preferably in the order of 25 to 100 microseconds. Other electronic modules connected to the voltage supply bus may also include capacitors that are appropriately sized to provide electrical power to these electronic modules during voltage transients on the voltage supply bus while the DC/DC converter 208 is transitioning between boost and buck modes. The electronic controller 206 also controls the direction and the magnitude of electrical power flowing through the DC/DC converter 208. The electronic controller 206 additionally monitors the operating voltage Vo of the voltage supply bus 218 and adaptively determines its nominal value, its rate of change, and, optionally, its frequency spectrum content. The UCM 100 may optionally include a switch 210 to protect the UCM 100 from reverse polarity voltage.

FIG. 2 is a block diagram of vehicle electrical system 212 utilizing ultracapacitor module 100 according to some embodiments. In some embodiments, vehicle electrical system 212 includes one or more power sources 214 (e.g., battery, alternator, etc.), one or more vehicle loads 216, a voltage supply bus 218, and the UCM 100. UCM 100 is connected to the voltage supply bus 218 and is configured to selectively provide power to the voltage supply bus 218 (boost mode) or receive power from the voltage supply bus 218 (buck mode). The voltage on the voltage supply bus 218 is designated as operating voltage Vo and may also be referred to as bus voltage.

In some embodiments, UCM 100 includes a plurality of ultracapacitor cells 204 connected in series with one another to form an ultracapacitor cell stack 202, a DC/DC converter 208, a switch 210 and an electronic controller 206. As shown in FIG. 2, DC/DC converter 208 is connected in series between the plurality of ultracapacitor cells 204 and the voltage supply bus 218. In general, UCM 100 operates by monitoring the operating voltage Vo on the voltage supply bus 218 and selectively operating DC/DC converter 208 to supply power to the voltage supply bus 218 when the operating voltage Vo falls below a threshold or target bus voltage value Vt (boost mode) and to receive power from the voltage supply bus 218 when the operating voltage Vo is above the threshold or target bus voltage value Vt (buck mode). To prevent the DC/DC converter 208 from oscillating between boost and buck modes, a dead band is set around the target bus voltage value Vt. The DC/DC converter 208 does not operate in boost mode until the operating voltage Vo is at or below a lower dead band limit and the DC/DC converter 208 will continue to operate in boost mode until the operating voltage Vo is raised/boosted back to the target bus voltage value Vt (or within an acceptable tolerance of the target bus voltage value Vt). Similarly, the DC/DC converter 208 does not operate in buck mode until the operating voltage Vo is at or above an upper dead band limit and the DC/DC converter 208 will continue to operate in buck mode until the operating voltage Vo is lowered/bucked back to the target bus voltage value Vt (or within an acceptable tolerance of the target bus voltage value Vt). The dead band is typically selected to accommodate variations in the operating voltage Vo, which may be affected by wire and connector resistance, ambient temperature, vehicle-to-vehicle variances, component tolerances, system life stage, and electrical noise. In some embodiments, the UCM 100 accounts for variations in the operating voltage Vo that allows for utilization of a smaller dead band range, as described in more detail below. In particular, in some embodiments the UCM 100 uses a table of voltage values (initial voltage value Vi) and corresponding temperatures. At vehicle start-up, a temperature of the UCM 100 is measured and the initial voltage value Vi for the corresponding temperature is selected from the table and is used to determine the target bus voltage value Vt. The voltage values in the table may be selectively updated over time in order to account for variances that are measured in the system. In this way, the UCM 100 is able to utilize learned voltage values to control the target bus voltage value Vt and thereby minimize the dead band range that may otherwise be required. In some embodiments, the target bus voltage value Vt may also be adjusted during operation of the UCM 100 based on additional inputs received from the vehicle regarding actual or expected loads, events, etc.

As shown in FIG. 2, electronic controller 206 is configured to monitor the operation of DC/DC converter 208 and includes a direction and current control block 220 to provide commands for controlling the operation of DC/DC converter 208. Monitoring may include utilizing one or more sensors 230, 234 to monitor the operating voltage Vo of the voltage supply bus 218. Monitoring may further include monitoring ultracapacitor cell stack temperature in order to map bus voltages to temperature. Electronic controller 206 provides as a command the direction of power flow (buck/boost) and a target voltage/current for the DC/DC converter 208. As described in more detail below, the target bus voltage value Vt may be adjusted by the electronic controller 206 based on additional inputs received from the vehicle regarding actual or expected loads, events, etc. By controlling the target bus voltage value Vt and controlling the direction of power flow (buck/boost), the dead band range may be significantly narrowed. Electronic controller 206 is also configured to monitor and control the operation of the ultracapacitor cell stack 202, including monitoring the balance, state of health (SOH), state of charge (SOC), diagnostics, safety, temperature, etc. associated with the ultracapacitor cell stack 202.

As shown in FIG. 2, UCM 100 may also include an electromagnetic interference/electromagnetic compliance (EMI/EMC) filter 222 and passive capacitance 224 between the voltage supply bus 218 and the voltage sensing input of the electronic controller 206 which then passes through an anti-aliasing filter 228 within the electronic controller 206. The UCM 100 may also include one or more current sensors 226 to monitor the current flowing to/from the ultracapacitor cells 204, a first temperature sensor 230 to measure the temperature of the ultracapacitor cells 204, a second temperature sensor 232 to measure the temperature of the DC/DC converter 208, and one or more voltage sensors 234 configured to measure the operating voltage Vo of the voltage supply bus 218.

As further shown in FIG. 2, the electronic controller 206 may also include a digital anti-aliasing filter 228 to filter the operating voltage Vo input from the voltage supply bus 218, thereby providing a filtered operating voltage Vo*. The filtered operating voltage Vo* is filtered to remove noise, such as that produced by the switching of the DC/DC converter 208 or other electrical devices connected to the voltage supply bus 218. The electronic controller 206 is also configured to compare the operating voltage Vo to the upper and lower dead band limits and determine a buck gain if the operating voltage Vo is above the upper dead band limit and determine a boost gain if the operating voltage Vo is below the lower dead band limit. The buck/boost gain is sent to the direction and current control block 220 in the controller 206 to provide the commands for controlling the DC/DC converter 208.

As shown in FIG. 2, the buck/boost DC/DC converter 208 is connected in series between the ultracapacitor cell stack 202 in the ultracapacitor module 100 and the voltage supply bus 218 and is operated under the direction of the electronic controller 206. The electronic controller 206 provides the DC/DC converter 208 with the ability to map the ultracapacitor cell stack 202 voltage to the operating voltage Vo. Actively controlling a programmable float voltage value Vf is the means of mapping the ultracapacitor cell stack 202 voltage to the operating voltage Vo.

The operating voltage Vo has a relatively large variance range due to temperature, operational tolerances of other components, vehicle-to-vehicle variance, ultracapacitor module life stage, and electrical noise on the voltage supply bus 218. A dual dead band, shown in the electronic controller 206 in FIG. 2 is established to avoid oscillation of the DC/DC converter 208 between boost and buck modes due to small variations of the operating voltage Vo. The dual dead band between boost and buck modes is as large as, or larger than, the variances and tolerances described above to avoid undesirable switching between boost and buck modes. With a large dead band, the electronic controller 206 cannot minimize a disturbance on the voltage supply bus 218 because control of the voltage supply bus 218 does not begin until the operating voltage Vo is outside the limits of the dead band. The electronic controller 206 may independently control an upper dead band with an upper dead band limit above the target bus voltage value Vt and a lower dead band with a lower dead band limit below the target bus voltage value Vt. The DC/DC converter 208 does not operate in boost mode until the operating voltage Vo is at or below the lower dead band limit and the DC/DC converter 208 will continue to operate in boost mode until the operating voltage Vo is raised/boosted back to the target bus voltage value Vt (or within an acceptable tolerance of the target bus voltage value Vt). Similarly, the DC/DC converter 208 does not operate in buck mode until the operating voltage Vo is at or above the upper dead band limit and the DC/DC converter 208 will continue to operate in buck mode until the operating voltage Vo is lowered/bucked back to the target bus voltage value Vt (or within an acceptable tolerance of the target bus voltage value Vt).

In some embodiments, the target bus voltage value Vt, the upper dead band limit and the lower dead band limit may be set by an external module over a LIN/CAN communication bus so that the UCM 100 operates in a primary/secondary relationship with a vehicle DC/DC converter (not shown). In other embodiments, the target bus voltage value Vt, the upper dead band limit and the lower dead band limit may be set to the same value by an external module over a LIN/CAN communication bus to provide filtering of a sinusoidal noise voltage on the voltage supply bus 218, e.g., caused by an alternator.

Figure 3:
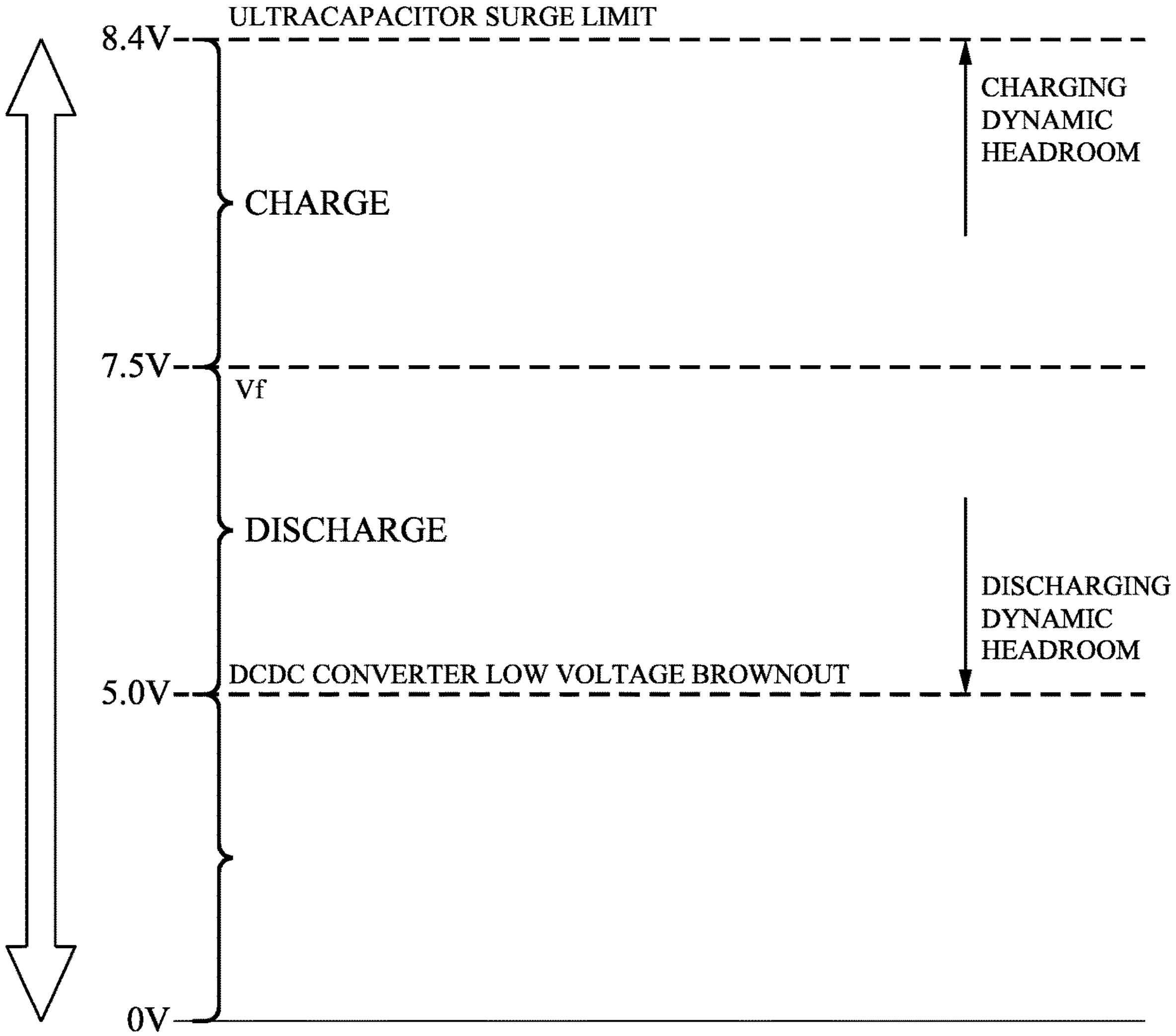
FIG. 3 is a diagram of a voltage range of an ultracapacitor cell stack and a programmable float voltage value of an ultracapacitor module according to some embodiments.

FIG. 3 shows the operating voltage range of the ultracapacitor cell stack 202 between an upper voltage limit (designated as "ULTRACAPACITOR SURGE LIMIT" in FIG. 3) and a lower voltage limit (designated as "DCDC CONVERTER LOW VOLTAGE BROWNOUT" in FIG. 3). The upper voltage limit is set to protect the ultracapacitor cell stack 202 from absorbing excess voltage from the voltage supply bus 218 that would damage the ultracapacitor cell stack 202. The lower voltage limit is set at a level below which the ultracapacitor cell stack 202 is not able to supply enough power to the DC/DC converter 208 to raise the voltage on the voltage supply bus 218. The programmable float voltage value Vf is set between the upper and lower voltage limits and can be controlled by the electronic controller 206. The float voltage value Vf can be shifted down to increase charging headroom between the float voltage value Vf and the upper voltage limit, which decreases the discharging headroom between the float voltage value Vf and the lower voltage limit. Alternatively, the float voltage value Vf can be shifted up to increase discharging headroom between the float voltage value Vf and the lower voltage limit, which decreases the charging headroom between the float voltage value Vf and the upper voltage limit. The ultracapacitor cell stack 202 is charged to absorb excess voltage on the voltage supply bus 218 and the ultracapacitor cell stack 202 is discharged to provide electrical power to raise the voltage on the voltage supply bus 218.

Figure 4:
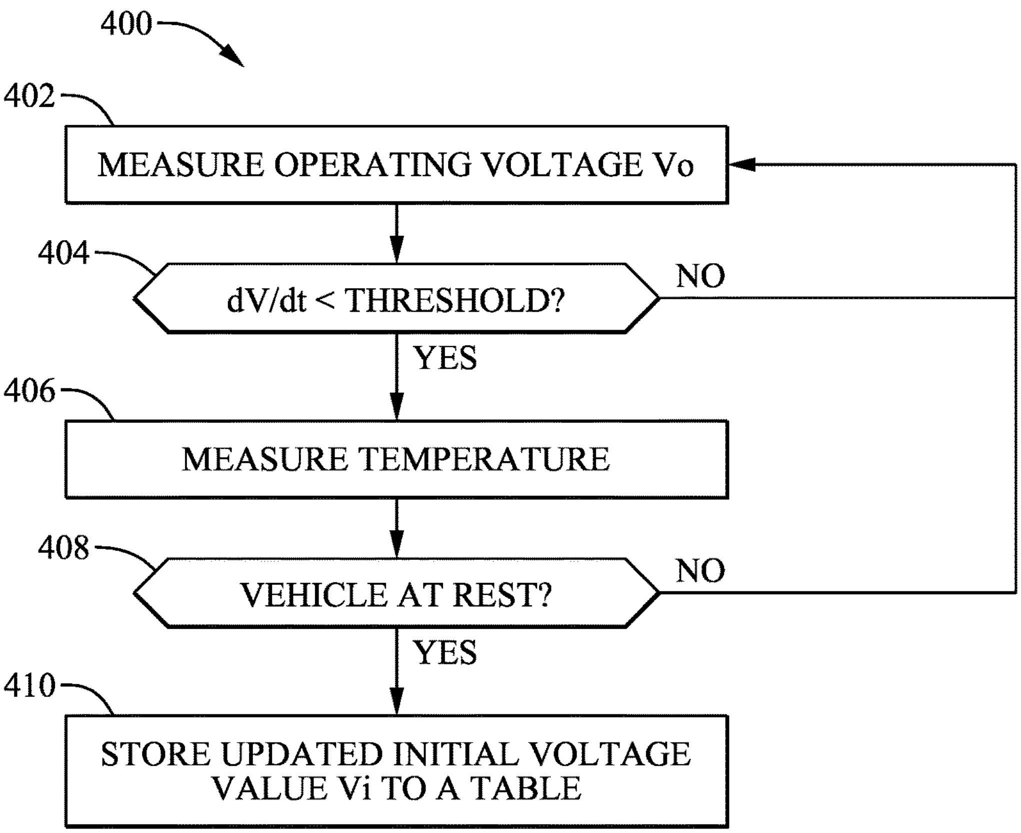
FIG. 4 is a flow chart of operation of an ultracapacitor module according to some embodiments.

Non-volatile memory for the electronic controller 206 contains a table of voltage values (initial voltage value Vi) and corresponding temperatures. The table may be initially populated with a set of default voltage values that may be updated over time by method 400, as shown in FIG. 4, that is performed by the electronic controller 206 to accommodate differences in the particular voltage supply bus and changes that occur over time due to aging of components, such as increases in wiring and connector resistance.

At step 402, the operating voltage Vo is measured. At step 404, a determination is made whether the rate of change (dV/dt) of the operating voltage Vo is less than a threshold value. That is, a determination is made whether the operating voltage Vo is stable. In some embodiments, the threshold value is a near zero value, i.e., 0±10 mV/sec. If the rate of change dV/dt is not less than the threshold value, thereby indicating that the operating voltage Vo is not stable, then monitoring of the operating voltage Vo continues at step 402. If the rate of change dV/dt is less than the threshold value, indicating that the operating voltage Vo is stable, then at step 406, a temperature measurement is taken. In some embodiments, the temperature is received from the vehicle system and represents an ambient temperature of the vehicle. In other embodiments, the temperature is measured by the electronic controller 206 using a temperature sensor located on the UCM 100 (for example, associated with the DC/DC converter 208 and/or the ultracapacitor cell stack 202). At step 408, a determination is made whether the vehicle is at rest. If the vehicle is at rest, then at step 410, the initial voltage value Vi stored in the table corresponding to the measured temperature may be updated with a new value that takes into account the measured operating voltage Vo at the measured temperature. If it is determined at step 408 that the vehicle is not at rest, then monitoring of the operating voltage Vo continues at step 402.

Figure 5:
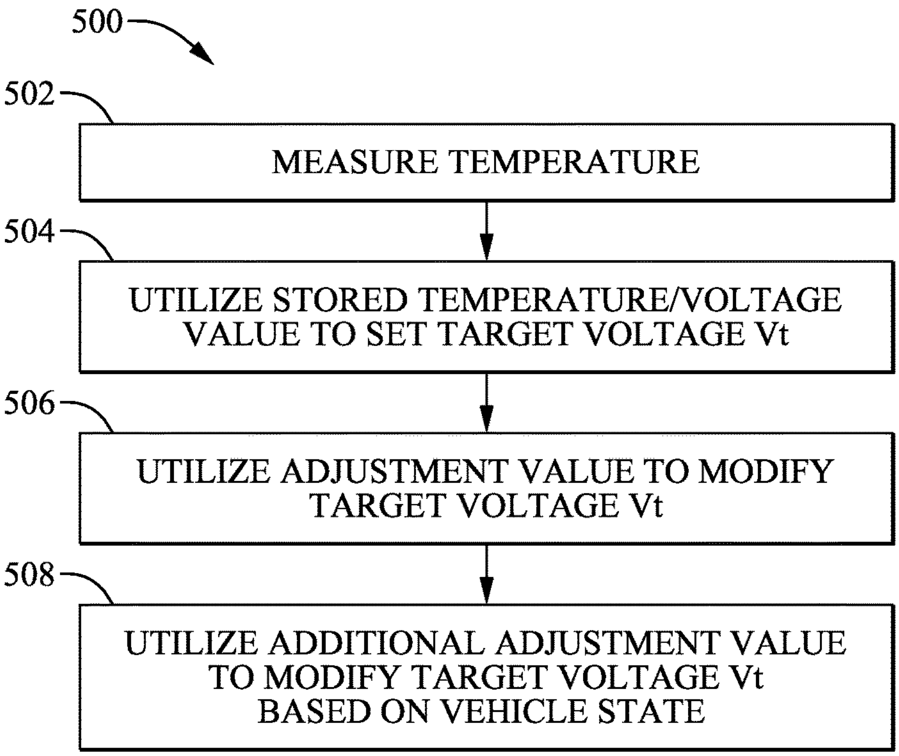
FIG. 5 is diagram of a method of operating an ultracapacitor module according to some embodiments.

Referring to FIG. 5, the method 500 includes steps performed by the electronic controller 206 to utilize the table of temperature/voltage values to set the target bus voltage value Vt. In some embodiments, at step 502 the temperature is measured or received by the electronic controller 206. For example, in some embodiments the same temperature sensor utilized to measure temperature at step 406 is utilized at step 502. At step 504, the electronic controller 206 utilizes the temperature measured at step 502 and the table of temperature/voltage values to look up the corresponding initial voltage value Vi. In some embodiments, the initial voltage value Vi identified by the table is utilized by the electronic controller 206 as the target bus voltage value Vt. As described with respect to FIG. 4, the initial voltage value Vi defined in the table corresponds to a state when the vehicle is at rest. In some embodiments, when the vehicle is in motion, at step 506 an adjustment voltage value Va may be added to the initial voltage value Vi. The adjustment voltage value Va may be determined to be zero. In some embodiments, the target bus voltage value Vt utilized by the UCM 100 is defined as:

$$Vt=Vi+Va \quad \text{Equation 1}$$

In some embodiments, an additional adjustment voltage value VΔ may be added to the initial voltage value Vi and the adjustment voltage value Va to modify the target bus voltage value Vt based on the state of the vehicle (e.g., systems being utilized, expected to be utilized, etc.), as in step 508. More specifically, the additional adjustment voltage value VΔ may be determined in response to a signal received by the electronic controller 206 via a vehicle communication bus (e.g., a LIN or CAN bus) 236 indicating that a load connected to the voltage supply bus 218 has been switched on or off and/or a load connected to the voltage supply bus 218 is expected to be switched on or off. The electronic controller 206 is in electrical communication with the vehicle communication bus 236. The additional adjustment voltage value VΔ may be determined to be zero. In some embodiments, the target bus voltage value Vt utilized by the UCM 100 is defined as:

$$Vt=Vi+Va+V\Delta \quad \text{Equation 2}$$

In some embodiments, the target bus voltage value Vt is continuously updated during a driving session.

Figure 6:
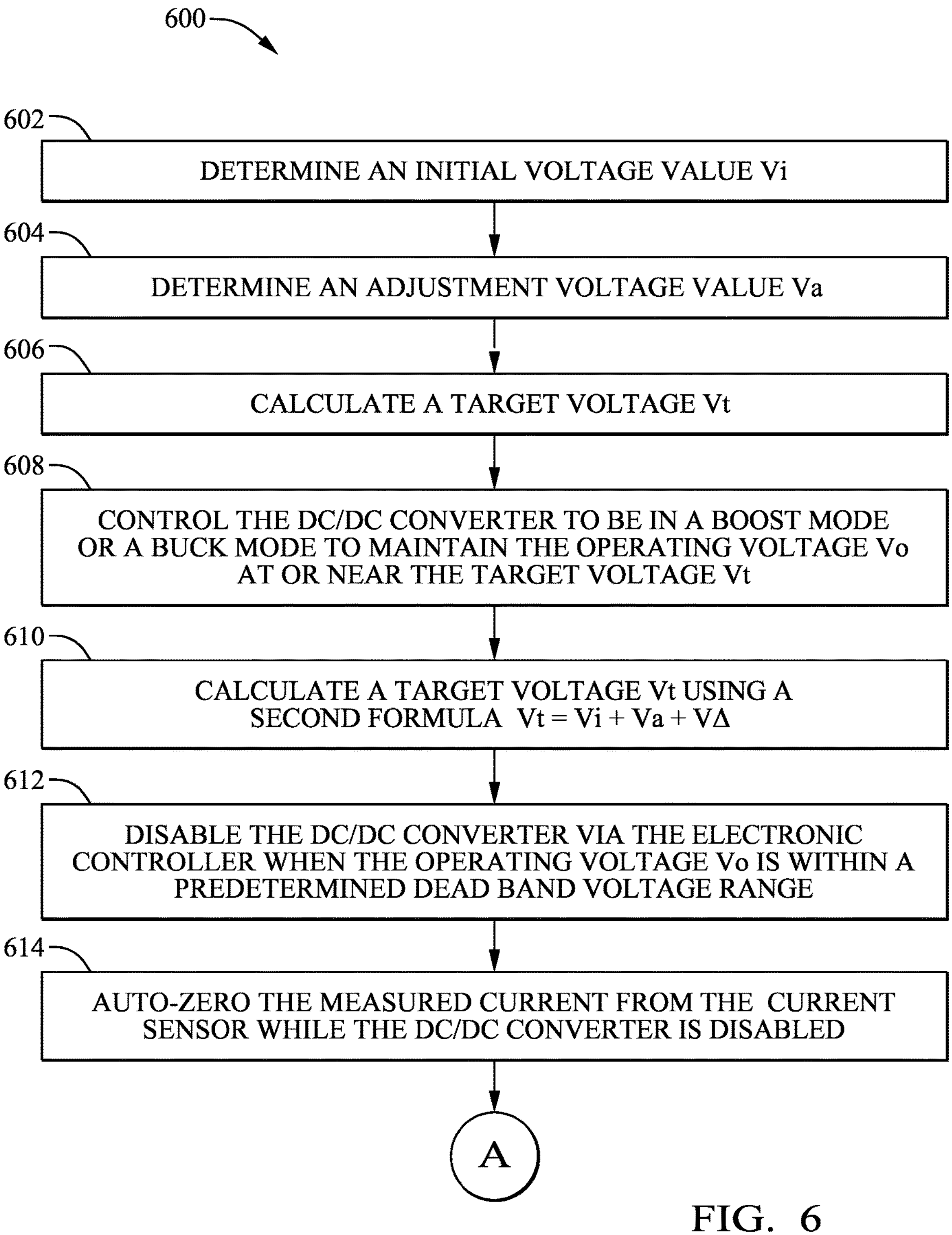
FIG. 6 is diagram of a method of operating an ultracapacitor module connected to a voltage supply bus of a vehicle according to some embodiments.

Referring to FIG. 6, the method 600 of operating an ultracapacitor module 100 connected to a voltage supply bus 218 of a vehicle includes the following steps. The ultracapacitor module 100 has an ultracapacitor cell stack 202 containing one or more ultracapacitor cells 204 and a bidirectional boost/buck DC/DC converter 208. The ultracapacitor cell stack 202 and the DC/DC converter 208 are connected in series with the voltage supply bus 218. A temperature sensor is configured to measure a temperature T. In some embodiments, the temperature T is received from the vehicle system and represents an ambient temperature of the vehicle. In other embodiments, the temperature T is measured by the electronic controller 206 using a temperature sensor located on the UCM 100 (for example, a first temperature sensor 230 to measure a temperature Ts associated with the ultracapacitor cell stack 202 and/or a second temperature sensor 232 to measure a temperature Tc associated with the DC/DC converter 208). One or more voltage sensors 234 are configured to determine an operating voltage Vo of the voltage supply bus 218. An electronic controller 206 is in electrical communication with the DC/DC converter 208, the temperature sensor, and the one or more voltage sensors 234. In step 602, the electronic controller 206 determines an initial voltage value Vi from a table of temperature/voltage values based on the measured temperature T that is used to look up the corresponding initial voltage value Vi in the table. In step 604, the electronic controller 206 determines an adjustment voltage value Va when the rate of change dV/dt of the operating voltage Vo is less than a predetermined threshold and the vehicle is operating and mobile. In step 606, the electronic controller 206 calculates a target bus voltage value Vt using Equation 1. In step 608, the electronic controller 206 controls the DC/DC converter 208 to be in a boost mode or a buck mode to maintain the operating voltage Vo at or near the target bus voltage value Vt.

In some embodiments, in step 610, the electronic controller 206 determines an additional adjustment voltage value VΔ in response to receiving a signal via a vehicle communication bus 236 and calculates a target bus voltage value Vt using Equation 2.

In some embodiments, in step 612, the electronic controller 206 disables the DC/DC converter 208 when the operating voltage Vo is within a predetermined dead band range higher and/or lower than the target bus voltage value Vt. In this state the switching of the DC/DC converter 208 may be stopped to minimize power consumption, reduce electrical noise, and ensure that no current is flowing into or out of the ultracapacitor cell stack 202.

In some embodiments, the ultracapacitor module 100 further includes at least one current sensor 226 in electrical communication with the electronic controller 206. The current sensor 226 is configured to measure current into or out of the ultracapacitor cell stack 202. In step 614, the measured current from the current sensor 226 is auto-zeroed while the DC/DC converter 208 is disabled.

In some embodiments, in step 616, the electronic controller 206 updates the value of an initial voltage value Vi in a table stored in memory with a new value that takes into account an operating voltage Vo measured at a temperature corresponding to the initial voltage value Vi in the table. In step 618, at start up, the electronic controller 206 measures the temperature T. In step 620, the electronic controller 206 recalls the initial voltage value Vi from the table stored in memory for the measured temperature T and calculates the target bus voltage value Vt.

In some embodiments, in step 622, the electronic controller 206 controls the direction and magnitude of electrical power flow through the DC/DC converter 208.

In some aspects, the techniques described herein relate to an ultracapacitor module configured to be connected to a voltage supply bus of a vehicle, the ultracapacitor module including: an ultracapacitor cell stack containing one or more ultracapacitor cells; a bidirectional boost/buck DC/DC converter, wherein the ultracapacitor cell stack and the DC/DC converter are connected in series with the voltage supply bus; a temperature sensor configured to measure a temperature T; one or more voltage sensors configured to determine an operating voltage Vo of the voltage supply bus; and an electronic controller in electrical communication with the DC/DC converter, the temperature sensor, and the one or more voltage sensors, wherein the electronic controller is configured to: determine an initial voltage value Vi corresponding to the measured temperature T, determine an adjustment voltage value Va when the rate of change dV/dt of the operating voltage Vo is less than a predetermined threshold, calculate a target bus voltage value Vt using a first formula Vt=Vi+Va, and control the DC/DC converter to be in a boost mode or a buck mode to maintain the operating voltage Vo at or near the target bus voltage value Vt.

In some aspects, the techniques described herein relate to an ultracapacitor module, wherein the electronic controller is further in electrical communication with a vehicle communication bus and wherein the electronic controller is further configured to calculate the target bus voltage value Vt using a second formula Vt=Vi+Va+VA, where VΔ is a value provided from an external vehicle control module to the electronic controller via the vehicle communication bus indicating a change or expected change in a voltage supply bus load.

In some aspects, the techniques described herein relate to an ultracapacitor module, wherein the electronic controller is further configured to disable the DC/DC converter when the operating voltage Vo is within a predetermined dead band range higher and/or lower than the target bus voltage value Vt.

In some aspects, the techniques described herein relate to an ultracapacitor module, wherein the ultracapacitor cell stack contains two or more ultracapacitor cells connected in series/parallel combinations.

In some aspects, the techniques described herein relate to an ultracapacitor module, wherein the electronic controller is further configured to: update the initial voltage value Vi in memory with a new initial voltage value Vi, measure the temperature T at start up, and recall the new initial voltage value Vi from memory for the measured temperature T and use the new initial voltage value Vi to calculate the target bus voltage value Vt.

In some aspects, the techniques described herein relate to an ultracapacitor module, wherein the electronic controller is further configured to control direction and magnitude of electrical power flow through the DC/DC converter.

In some aspects, the techniques described herein relate to an ultracapacitor module, wherein the temperature sensor is one of a first temperature sensor in electrical communication with the electronic controller and configured to measure a first temperature Ts of the ultracapacitor cell stack and a second temperature sensor in electrical communication with the electronic controller and configured to measure a second temperature Tc of the DC/DC converter.

In some aspects, the techniques described herein relate to an ultracapacitor module, further including a current sensor in electrical communication with the electronic controller and configured to measure current into or out of the ultracapacitor cell stack.

In some aspects, the techniques described herein relate to a method of operating an ultracapacitor module connected to a voltage supply bus of a vehicle, the ultracapacitor module having an ultracapacitor cell stack containing one or more ultracapacitor cells in series/parallel combination, a bidirectional boost/buck DC/DC converter, wherein the ultracapacitor cell stack and the DC/DC converter are connected in series with the voltage supply bus, a temperature sensor configured to measure a temperature T, one or more voltage sensors configured to determine an operating voltage Vo of the voltage supply bus, and an electronic controller in electrical communication with the DC/DC converter, the temperature sensor, and the one or more voltage sensors, the method including: determining an initial voltage value Vi via the electronic controller corresponding to the measured temperature T; determining an adjustment voltage value Va via the electronic controller when the rate of change dV/dt of the operating voltage Vo is less than a predetermined threshold and vehicle is operating and mobile, calculating a target bus voltage value Vt via the electronic controller using a first formula Vt=Vi+Va, and controlling the DC/DC converter via the electronic controller to be in a boost mode or a buck mode to maintain the operating voltage Vo at or near the target bus voltage value Vt.

In some aspects, the techniques described herein relate to a method, wherein the electronic controller is further in electrical communication with a vehicle communication bus and wherein the method further includes further calculating the target bus voltage value Vt using an additional adjustment voltage value VΔ provided from an external vehicle control module to the electronic controller via the vehicle communication bus indicating a change or expected change in a voltage supply bus load.

In some aspects, the techniques described herein relate to a method, wherein the method further includes disabling the DC/DC converter via the electronic controller when the operating voltage Vo is within a predetermined dead band range higher and/or lower than the target bus voltage value Vt.

In some aspects, the techniques described herein relate to a method, wherein the ultracapacitor module further includes a current sensor in electrical communication with the electronic controller and configured to measure current into or out of the ultracapacitor cell stack and wherein the method further includes auto-zeroing the measured current from the current sensor while the DC/DC converter is disabled.

In some aspects, the techniques described herein relate to a method, further including updating the initial voltage value Vi in memory with a new initial voltage value Vi; at start up, measuring the temperature T via the electronic controller; and recalling the new initial voltage value Vi from memory via the electronic controller for the measured temperature T and using the new initial voltage value Vi to calculate the target bus voltage value Vt.

In some aspects, the techniques described herein relate to a method, further including controlling direction and magnitude of electrical power flow through the DC/DC converter via the electronic controller.

In some aspects, the techniques described herein relate to a computer readable medium containing program instructions for operating an ultracapacitor module connected to a voltage supply bus of a vehicle, the ultracapacitor module having an ultracapacitor cell stack containing one or more ultracapacitor cells, a bidirectional boost/buck DC/DC converter, wherein the ultracapacitor cell stack and the DC/DC converter are connected in series with the voltage supply bus, a temperature sensor configured to measure a temperature T, one or more voltage sensors configured to determine an operating voltage Vo of the voltage supply bus, and an electronic controller in electrical communication with the DC/DC converter, the temperature sensor, and the one or more voltage sensors, wherein execution of the program instructions by one or more processors of a computer system causes the electronic controller to carry out: determining an initial voltage value Vi corresponding to the measured temperature T; determining an adjustment voltage value Va when the rate of change dV/dt of the operating voltage Vo is less than a predetermined threshold and vehicle is operating, calculating a target bus voltage value Vt using a first formula Vt=Vi+Va, and controlling the DC/DC converter to be in a boost mode or a buck mode to maintain the operating voltage Vo at or near the target bus voltage value Vt.

In some aspects, the techniques described herein relate to a computer readable medium, wherein execution of the program instructions by one or more processors of a computer system further causes the electronic controller to carry out further calculating the target bus voltage value Vt using an additional adjustment voltage value VΔ provided from an external vehicle control module to the electronic controller via the vehicle communication bus indicating a change or expected change in a voltage supply bus load.

In some aspects, the techniques described herein relate to a computer readable medium, wherein execution of the program instructions by one or more processors of a computer system further causes the electronic controller to carry out disabling the DC/DC converter via the electronic controller when the operating voltage Vo is within a predetermined dead band range higher and/or lower than the target bus voltage value Vt.

In some aspects, the techniques described herein relate to a computer readable medium, wherein execution of the program instructions by one or more processors of a computer system further causes the electronic controller to carry out switching off the DC/DC converter when the operating voltage Vo is within a predetermined dead band range higher and/or lower than the target bus voltage value Vt.

In some aspects, the techniques described herein relate to a computer readable medium, wherein execution of the program instructions by one or more processors of a computer system further causes the electronic controller to disable the DC/DC converter when the operating voltage Vo is within a predetermined dead band range higher and/or lower than the target bus voltage value Vt.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the disclosed embodiment(s), but that the invention will include all embodiments falling within the scope of the appended claims.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

The invention claimed is:

1. An ultracapacitor module configured to be connected to a voltage supply bus of a vehicle, the ultracapacitor module comprising:

an ultracapacitor cell stack containing one or more ultracapacitor cells;

a bidirectional boost/buck DC/DC converter, wherein the ultracapacitor cell stack and the DC/DC converter are connected in series with the voltage supply bus;

a temperature sensor configured to measure a temperature T;

one or more voltage sensors configured to determine an operating voltage Vo of the voltage supply bus; and an electronic controller in electrical communication with the DC/DC converter, the temperature sensor, and the one or more voltage sensors, wherein the electronic controller is configured to:

determine an initial voltage value Vi corresponding to the measured temperature T, determine an adjustment voltage value Va when a rate of change dV/dt of the operating voltage Vo is less than a predetermined threshold, calculate a target bus voltage value Vt using a first formula Vt=Vi+Va, and control the DC/DC converter to be in a boost mode or a buck mode to maintain the operating voltage Vo at or near the target bus voltage value Vt.

2. The ultracapacitor module in accordance with claim 1, wherein the electronic controller is further in electrical communication with a vehicle communication bus and wherein the electronic controller is further configured to calculate the target bus voltage value Vt using a second formula Vt=Vi+Va+VΔ, where VΔ is a value provided from an external vehicle control module to the electronic controller via the vehicle communication bus indicating a change or expected change in a voltage supply bus load.

3. The ultracapacitor module in accordance with claim 1, wherein the electronic controller is further configured to disable the DC/DC converter when the operating voltage Vo is within a predetermined dead band range higher and/or lower than the target bus voltage value Vt.

4. The ultracapacitor module in accordance with claim 1, wherein the ultracapacitor cell stack contains two or more ultracapacitor cells connected in series/parallel combinations.

5. The ultracapacitor module in accordance with claim 1, wherein the electronic controller is further configured to:

update the initial voltage value Vi in memory with a new initial voltage value Vi, measure the temperature T at start up, and recall the new initial voltage value Vi from memory for the measured temperature T and use the new initial voltage value Vi to calculate the target bus voltage value Vt.

6. The ultracapacitor module in accordance with claim 1, wherein the electronic controller is further configured to control direction and magnitude of electrical power flow through the DC/DC converter.

7. The ultracapacitor module in accordance with claim 1, wherein the temperature sensor is one of a first temperature sensor in electrical communication with the electronic controller and configured to measure a first temperature Ts of the ultracapacitor cell stack and a second temperature sensor in electrical communication with the electronic controller and configured to measure a second temperature Tc of the DC/DC converter.

8. The ultracapacitor module in accordance with claim 1, further comprising a current sensor in electrical communication with the electronic controller and configured to measure current into or out of the ultracapacitor cell stack.

9. A method of operating an ultracapacitor module connected to a voltage supply bus of a vehicle, the ultracapacitor module having an ultracapacitor cell stack containing one or more ultracapacitor cells in series/parallel combination, a bidirectional boost/buck DC/DC converter, wherein the ultracapacitor cell stack and the DC/DC converter are connected in series with the voltage supply bus, a temperature sensor configured to measure a temperature T, one or more voltage sensors configured to determine an operating voltage Vo of the voltage supply bus, and an electronic controller in electrical communication with the DC/DC converter, the temperature sensor, and the one or more voltage sensors, the method comprising:

determining an initial voltage value Vi via the electronic controller corresponding to the measured temperature T;

determining an adjustment voltage value Va via the electronic controller when a rate of change dV/dt of the operating voltage Vo is less than a predetermined threshold and vehicle is operating and mobile, calculating a target bus voltage value Vt via the electronic controller using a first formula Vt=Vi+Va, and controlling the DC/DC converter via the electronic controller to be in a boost mode or a buck mode to maintain the operating voltage Vo at or near the target bus voltage value Vt.

10. The method in accordance with claim 9, wherein the electronic controller is further in electrical communication with a vehicle communication bus and wherein the method further comprises further calculating the target bus voltage value Vt using an additional adjustment voltage value VΔ provided from an external vehicle control module to the electronic controller via the vehicle communication bus indicating a change or expected change in a voltage supply bus load.

11. The method in accordance with claim 9, wherein the method further comprises disabling the DC/DC converter via the electronic controller when the operating voltage Vo is within a predetermined dead band range higher and/or lower than the target bus voltage value Vt.

12. The method in accordance with claim 11, wherein the ultracapacitor module further includes a current sensor in electrical communication with the electronic controller and configured to measure current into or out of the ultracapacitor cell stack and wherein the method further comprises auto-zeroing the measured current from the current sensor while the DC/DC converter is disabled.

13. The method in accordance with claim 9, further comprising:

updating the initial voltage value Vi in memory with a new initial voltage value Vi;

at start up, measuring the temperature T via the electronic controller; and recalling the new initial voltage value Vi from memory via the electronic controller for the measured temperature T and using the new initial voltage value Vi to calculate the target bus voltage value Vt.

14. The method in accordance with claim 9, further comprising controlling direction and magnitude of electrical power flow through the DC/DC converter via the electronic controller.

15. A non-transitory computer readable medium containing program instructions for operating an ultracapacitor module connected to a voltage supply bus of a vehicle, the ultracapacitor module having an ultracapacitor cell stack containing one or more ultracapacitor cells, a bidirectional boost/buck DC/DC converter, wherein the ultracapacitor cell stack and the DC/DC converter are connected in series with the voltage supply bus, a temperature sensor configured to measure a temperature T, one or more voltage sensors configured to determine an operating voltage Vo of the voltage supply bus, and an electronic controller in electrical communication with the DC/DC converter, the temperature sensor, and the one or more voltage sensors, wherein execution of the program instructions by one or more processors of a computer system causes the electronic controller to carry out:

determining an initial voltage value Vi corresponding to the measured temperature T;

determining an adjustment voltage value Va when a rate of change dV/dt of the operating voltage Vo is less than a predetermined threshold and vehicle is operating;

calculating a target bus voltage value Vt using a first formula Vt=Vi+Va, and controlling the DC/DC converter to be in a boost mode or a buck mode to maintain the operating voltage Vo at or near the target bus voltage value Vt.

16. The non-transitory computer readable medium according to claim 15, wherein execution of the program instructions by one or more processors of a computer system further causes the electronic controller to carry out further calculating the target bus voltage value Vt using an additional adjustment voltage value VΔ provided from an external vehicle control module to the electronic controller via the vehicle communication bus indicating a change or expected change in a voltage supply bus load.

17. The non-transitory computer readable medium according to claim 15, wherein execution of the program instructions by one or more processors of a computer system further causes the electronic controller to carry out disabling the DC/DC converter via the electronic controller when the operating voltage Vo is within a predetermined dead band range higher and/or lower than the target bus voltage value Vt.

18. The non-transitory computer readable medium according to claim 15, wherein execution of the program instructions by one or more processors of a computer system further causes the electronic controller to carry out switching off the DC/DC converter when the operating voltage Vo is within a predetermined dead band range higher and/or lower than the target bus voltage value Vt.

19. The non-transitory computer readable medium according to claim 15, wherein execution of the program instructions by one or more processors of a computer system further causes the electronic controller to disable the DC/DC converter when the operating voltage Vo is within a predetermined dead band range higher and/or lower than the target bus voltage value Vt.

* * * * *